March 23, 1965 F. PAPKE 3,174,391
ALBADA VIEWFINDERS WITH MOLDED LENS AND PLANE MIRROR
FOR VIEWING INDICATOR ELEMENT
Original Filed June 17, 1960 2 Sheets-Sheet 1
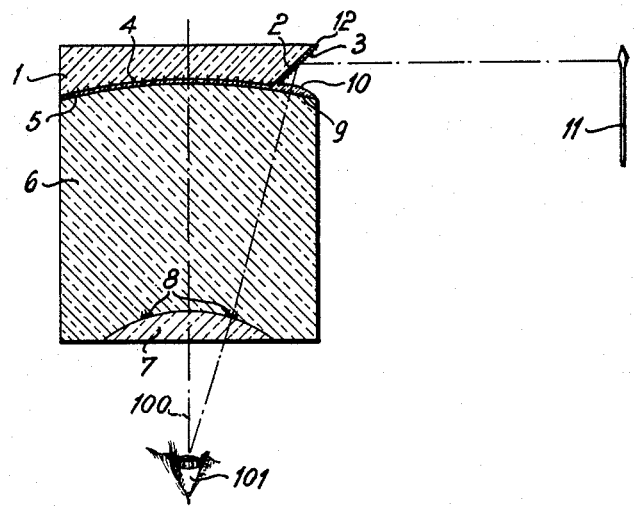
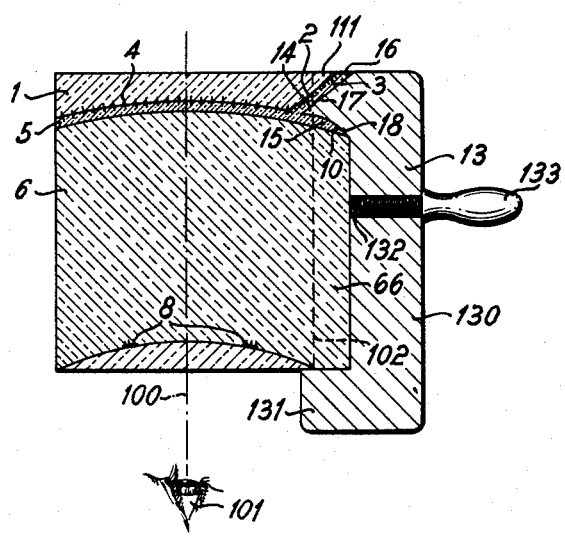
INVENTOR
FRIEDRICH PAPKE March 23, 1965 F. PAPKE 3,174,391
ALBADA VIEWFINDERS WITH MOLDED LENS AND PLANE MIRROR
FOR VIEWING INDICATOR ELEMENT
Original Filed June 17, 1960 2 Sheets-Sheet 2

INVENTOR
FRIEDRICH PAPKE

BY
Blum, Moscovitz,
Friedman & Blum
ATTORNEYS

United States Patent Office 3,174,391
Patented Mar. 23, 1965

3,174,391
ALBADA VIEWFINDERS WITH MOLDED LENS AND PLANE MIRROR FOR VIEWING INDICATOR ELEMENT
Friedrich Papke, Braunschweig, Germany, assignor to Voigtlander A.G., Braunschweig, Germany, a corporation of Germany
Original application June 17, 1960, Ser. No. 36,768. Divided and this application July 23, 1963, Ser. No. 297,996
5 Claims. (Cl. 88—1.5)

This invention relates to "Albada" type viewfinders and, more particularly, to a method of and apparatus for facilitating the assembly of "Albada" viewfinders of a special type. This application is a division of my co-pending application Serial No. 36,768, filed June 17, 1960, now abandoned.

It is known to provide "Albada" type viewfinders with special optical arrangements for reflecting, into the field of view of the viewfinder and in addition to the usual picture limiting frame, the adjusted position of an exposure condition setting or indicating means.

In the co-pending applications of Friedrich Papke et al., Serial No. 33,198, filed June 1, 1960, and Friedrich Papke, Serial No. 34,553, filed June 7, 1960, now Patent No. 2,978,727, it has been proposed to use, for thus reflecting the position of the exposure condition setting or adjusting means, the convexly curved outer end surface of the intermediate transparent block disposed between the front or light entry lens and the rear eyepiece or carrier for the picture limiting frame. The curvature of this convex surface corresponds generally to the curvature of the partially permeable concave mirror of the "Albada" viewfinder. This curvature is so utilized that it provides a lens action which provides, in the manner of a collimator and at substantially infinity, an image of the position of the indicating or adjusting means so that the latter appears in the image field of the viewfinder. The reflection of the light rays passing the setting or indicating element to be reflected into the field of view of the finder is effected, in accordance with such proposal, by a mirror arranged on an oblique surface formed directly on the front piece or lens of the viewfinder.

If the focal length used for the aforementioned lens action in delimiting the indicator or setting means image differs from the required focal length for proper functioning of the partially light permeable concave mirror of the viewfinder, as in order to assure proper functioning of the lens forming surface, a different radius of curvature must be provided on that part of the outer end of the intermediate body used in reflecting the position of the indicating or setting means. Optical surfaces having two different radii of curvature cannot be easily manufactured, particularly in the case of glass bodies.

The present invention is directed to a viewfinder capable of being manufactured according to a process by means of which it is possible, in a simple manner, to apply to the glass body used as the lens for providing the image of the indicating or setting means, a curved surface having a center or curvature either the same as or different from the center of curvature of the concave mirror, and a method which can be performed concurrently with the uniting of the front lens of the viewfinder to the central block thereof.

For an understanding of the principles of the invention, reference is made to the following description of typical embodiments thereof as illustrated in the accompanying drawings. In the drawings:

FIG. 1 is an axial sectional view through an "Albada" type viewfinder which can be formed utilizing the method of the invention;

FIG. 2 is an axial sectional view through an "Albada" type viewfinder which is geometrically asymmetrical with respect to its optical axis, and illustrating apparatus used in performing the method of the invention;

Figure 3:
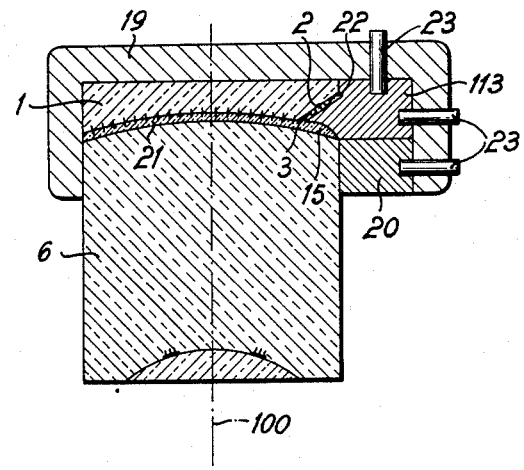
FIG. 3 is an axial sectional view of an "Albada" type viewfinder illustrating a different embodiment of the apparatus of the invention in operative position for performing the invention method.

Referring to the drawings, FIG. 1 schematically illustrates an "Albada" view finder of block construction and of the type which can be produced by the method and apparatus of the invention. The viewfinder illustrated in FIG. 1 comprises a light entry front element or lens 1 having formed on an oblique surface 2 thereof a mirror 3 which reflects, into the field of view of the viewfinder, the position of a pointer 11 which is representative of an indicating or setting element of a photographic camera. In the usually customary manner, front lens 1 has an inner spherically concave surface on which there is arranged or formed the partially light permeable mirror 4. Lens 1 is bonded to a central block or intermediate body 6, of transparent material, by a layer of cement 5. For this purpose, the body or block 6 preferably has an outer convex surface which may correspond in curvature to the concave surface carrying the mirror 4. The inner or rear surface of body 6 is concave to conformingly receive the outer convex surface of the rear member or eyepiece 7 of the finder, the picture limiting frame 8 to be reflected at infinity by the mirror 4 being cemented or otherwise arranged on this convex surface.

As stated, at least that portion of the outer end surface of body 6 disposed toward the front lens 1 is formed with the same curvature as the concave surface carrying the mirror 4. On that portion 9 of the outer end surface of block 6, and arranged opposite the oblique mirror 3, there is provided a surface having a curvature different from that of the mirror 4, this surface being indicated at 10 and, in the particular embodiment illustrated, having a sharper degree of curvature than the cement surface 5. However, in other embodiments the surface 10 can be flat or may be outwardly concave. Also, additional optical members can be arranged outside the viewfinder proper.

The curved surface 10 is curved in such a manner that the focusing of the image of the pointer 11 to be reflected is effected substantially at infinity by the thus formed lens 9. The mirror 3 on the oblique surface 2 is covered with a layer of cement 12 continuous with the cement layer 5. The optical axis of the viewfinder is indicated at 100, and the eye of an observer is indicated at 101.

As stated, the present invention is directed to the manufacture of an "Albada" viewfinder of the type shown in FIG. 1 or one of essentially similar construction. FIG. 2 illustrates one arrangement by means of which such a viewfinder can be manufactured in accordance with the invention. Referring to FIG. 2, a shaper 13 is so applied to the body of the viewfinder that the nose 14 of shaper 13 enters into the space between the mirror 3 and the body 6, but is spaced from the outer surface of body 6 and from the oblique mirrored surface 2. The under surface of nose 14, as viewed in FIG. 2, is spherically concave to correspond to the curvature of the surface 10 of FIG. 1.

Between the bodies 1 and 6 there is introduced a cement composition 5 which may overflow to a greater or lesser extent from the joints. Around nose 14 or shaper 13, this cement fills up the spaces 15 and 16. The cement is so selected that it adheres firmly both to the body 6 and to the partially permeable mirror 4 of the body 1, as well as to the mirror 3 on the oblique surface 2, but does not adhere to the surfaces 17 and 18 of shaper 13. After setting of the cement, the shaper 13 is removed and there remains the assembled viewfinder shown in FIG. 1, the solidified cement acting as a protective covering over the entire mirror 3 and forming the curved surface 10 on the body 6.

In accordance with the invention, the cement 5 has the same index of refraction as the intermediate or central block 6. By virtue of this provision, the work of polishing the convex surface of the body 6 is eliminated, and this surface need only be roughed, milled, or ground.

Ethoxylene or epoxide resins are particularly suitable as cements for use in the invention process, as they have good adherence to glass and to volatized coatings, but not to material such as "Plexiglass," "Plexigum," "Astralon," and other thermoplastics. For this reason, the shaping tool 13 is made of one of the latter substances or of similar substances. However, shaper 13 can also be made of metal provided with a parting agent avoiding adherence to the cements being used. The countermolds for the optically active surfaces of the viewfinder can be provided with the desired polish without difficulty when using these substances, thus assuring an efficient optical functioning of the reflecting system produced by the invention method.

In order to assure shaping tool 13 being maintained in precisely the correct position during the cementing, it is provided with holding and aligning members. Thus, in the arrangement shown in FIG. 2, tool 13 is provided with an extension member 130 resting against the side of block 6 and having a bent end 131 which engages firmly against the inner end surface of the viewfinder body. Also, shaper 13 is provided with a bore 132, preferably threaded, for receiving a manipulating handle 133 for facilitating positioning of the shaper. If advisable or necessary in any particularly case, the shaper 13 can be divided into a plurality of individual parts which either may be cemented together and then disassembled or which may be otherwise disengageably connected together. Irrespective of this, the method of shaping and cementing in accordance with the present invention is not thereby changed in essence.

In the particular arrangement shown in FIG. 2, the body of the viewfinder extends somewhat further from the optical axis toward the side to which is applied the arrangement for reflection of the pointer 11. The viewfinder would be symmetrically arranged with respect to the optical axis 100 if it terminated at the line 102, and this is possible and has no particular bearing to the present invention. However, the embodiment of FIG. 2 is particularly directed to the also feasible case in which the body of the viewfinder is geometrically asymmetric with respect to the optical axis. Thus, in this embodiment, the intermediate block 6 has the additional lateral extent 66 and the front lens 1 has the additional extension 111.

FIG. 3 illustrates another embodiment of the invention as applied to a viewfinder which is symmetrical with respect to its optical axis. In this case, a shaper 113 is held by a special clamp 19 which, together with an inserted clamp member 20, engages over and aligns the parts 1 and 6 to be joined. By means of the holding tool elements 19 and 20, the joint 21 between the central body 6 and the front lens 1, and the joint 22 between the central body 6 and the front lens 1, are closed off from the outside and sealed at the oblique surface 2 carrying the mirror 3. Thus, a dependable exact cementing together of the viewfinder members, as well as the shaping of the reflecting lens 15, is assured. Clamp 19 can be assembled in a disengageable manner with bodies 113 and 20 by means of pins 23.

Figure 4:
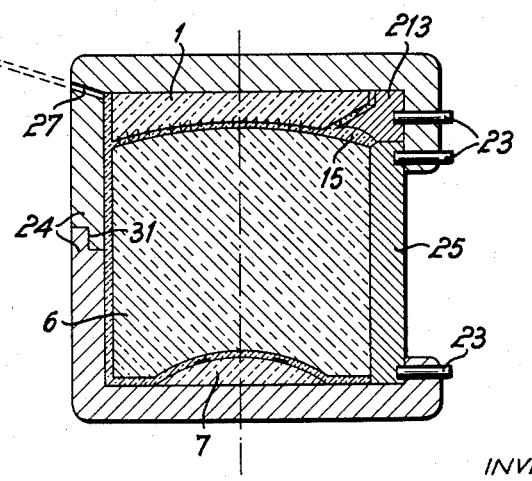
FIG. 4 is a view similar to FIG. 3 showing the apparatus utilized for performing the invention, in the form of a housing enclosing the several parts of the viewfinder.

FIG. 4 illustrates a further embodiment of the invention in which the clamp of FIG. 3 is further developed to form a clamp-like housing 24 surrounding the entire viewfinder, and which may be made in two disengageably assembled parts. The eyepiece or ocular 7 is detachably mounted on the rear portion of the housing 24, while the front lens 1 is detachably mounted on the front portion of the housing member 24. A shaper 213 and a wall member 25 may be integral with the housing 24 or may be disengageably connected thereto or inserted therein as separate parts. The viewfinder central or intermediate block 6 is detachably mounted on the carrying or closure member 25 which holds the body 6 in the required vertical and lateral position with respect to members 1 and 7. The components 24, 25 and 213 conjointly form a mold, and the space remaining between the inner surface of this mold and the bodies 1, 6 and 7 is filled by means of a cement spraygun 26, or the like, this gun being applied to a filling opening 27 in the housing 24. In the arrangement of FIG. 4, there is a space extending along one side wall of the viewfinder body, and the layer of cement filling this space can be left on this wall of the viewfinder body as it does not interfere with proper optical functioning of the viewfinder. After setting of the cement, the parts 1, 6 and 7 are released from the housing 24 and from the carrier 25 and shaper 213.

The method illustrated in FIG. 4 is particularly well adapted for mass production, and has the further considerable advantage that the entire viewfinder body is made with great precision without the individual parts having to have a particularly high precision. Deviations from tolerances in the individual structural parts are compensated by the gaps having a greater or lesser thickness, the thickness of the cement filling the gaps not having any detrimental effect on the optical properties of the viewfinder. Of course, the cement used in this embodiment of the invention must necessarily have the same index of refraction as that of the structural parts 1, 6 and 7 which are cemented or cast together. The front surface of the viewfinder facing toward the objective, and the flat surface of the viewfinder facing toward the eye, are maintained free of cement. The surfaces can be subsequently covered with a thin reflecting layer, or this thin reflecting layer can be provided on such flat surfaces prior to bonding of the components of the viewfinder together.

The detachable mounting of the lens 1 and 7 to the form 24 can be effected with a detachable adhesive or, for example, with double acting adhesive sheets which can be easily removed again after removal of the covering 24, or which can remain, until mounting of the viewfinder in the camera, as protecting means for the bonding surfaces of the several parts. In the arrangement shown in FIG. 4, 23 again illustrates holding pins which could be provided if necessary and which serve to connect the separate parts 213 and 25 with the housing 24. Pins 23 may also have an aligning function. As indicated at 31, the housing 24 can be developed in two or more parts.

While specific embodiments of the invention have been shown and described in detail to illustrate the application of the principles of the invention, it will be understood that the invention may be embodied otherwise without departing from such principles.

What is claimed is:

1. In a block type Albada viewfinder for photographic cameras, including a front plano-concave lens, a central lens having a convex outer surface facing the concave surface of said front lens and a concave inner surface, an ocular having a convex surface facing the concave surface of the central lens, a semi-transparent mirror disposed between the adjacent surfaces of the front and central lenses, and a picture limiting frame disposed between the adjacent surfaces of the central lens and of the ocular: means for providing, in the field of view of an observer looking through the ocular, an image of the position of an exposure condition indicating element of the camera located extraneous to the viewfinder, said means comprising a lateral plane surface formed on said front lens oblique to the optical axis of the viewfinder and facing toward the convex outer surface of said central lens, said lateral plane surface being substantially completely within the lateral confines of the viewfinder; the lateral extent of the concave surface of said front lens being less than the lateral extent of the convex surface of said central lens by substantially the depth of the recess formed by said lateral plane surface so that a portion of the convex surface of said central lens extends laterally beyond the concave surface of said front lens; a mirror on said oblique lateral plane surface operable to reflect the light rays from the indicating element to the eye of an observer looking into the viewfinder through said ocular and along the optical axis of the viewfinder; an image forming optical element in the path of light rays reflected by said mirror through said ocular, said image forming optical element comprising a molded deposit of transparent synthetic resin adhered to the projecting portion of the convex surface of said central lens and having light refracting characteristics such as to provide, in the field of view of such viewer looking into the viewfinder through said ocular and along the optical axis of the viewfinder, a sharply focused image of said element in addition to the sharply focused images of the subject to be photographed and of said picture limiting frame; and a layer of transparent synthetic resin covering the outer surface of said plane mirror, said optical element being integral with and forming a continuation of said layer.

2. In a block type Albada viewfinder for photographic cameras, means as claimed in claim 1, in which said optical element has an outer surface facing said plane mirror and having a curvature which is sharper than that of the convex surface of said central lens, said optical element projecting into the recess defined by said oblique lateral plane surface and the projecting portion of the convex surface of said central lens.

3. In a block type Albada viewfinder for photographic cameras, means as claimed in claim 1, said layer of transparent synthetic resin also extending between the concave surface of said front lens and the convex surface of said central lens and forming an interface therebetween.

4. In a block type Albada viewfinder for photographic cameras, means as claimed in claim 1, in which said oblique lateral plane surface extends the full distance between the inner and outer surfaces of said front lens.

5. In a block type Albada viewfinder for photographic cameras, means as claimed in claim 1, in which said oblique lateral plane surface extends outwardly from the inner concave surface of said front lens and terminates inwardly of the outer plane surface of said front lens.

No references cited.

DAVID H. RUBIN, *Primary Examiner.*